United States Patent
Baker et al.

(10) Patent No.: US 9,392,592 B2
(45) Date of Patent: Jul. 12, 2016

(54) METHOD FOR COMMUNICATION IN A MOBILE NETWORK

(75) Inventors: Matthew Peter John Baker, Canterbury (GB); Timothy James Moulsley, Caterham (GB); Milos Tesanovic, Cambridge (GB)

(73) Assignee: Koninklijke Philips N.V., Eindhoven (NL)

( * ) Notice: Subject to any disclaimer, the term of this patent is extended or adjusted under 35 U.S.C. 154(b) by 336 days.

(21) Appl. No.: 13/318,009

(22) PCT Filed: Apr. 22, 2010

(86) PCT No.: PCT/IB2010/051765
§ 371 (c)(1),
(2), (4) Date: Oct. 28, 2011

(87) PCT Pub. No.: WO2010/125502
PCT Pub. Date: Nov. 4, 2010

(65) Prior Publication Data
US 2012/0046027 A1 Feb. 23, 2012

(30) Foreign Application Priority Data
Apr. 29, 2009 (EP) .................................. 09305378

(51) Int. Cl.
*H04W 4/00* (2009.01)
*H04W 72/04* (2009.01)
(Continued)

(52) U.S. Cl.
CPC ........... *H04W 72/042* (2013.01); *H04L 5/0092* (2013.01); *H04L 5/0096* (2013.01); *H04L 5/0053* (2013.01); *H04W 52/0229* (2013.01)

(58) Field of Classification Search
CPC ..... H04L 5/0053; H04L 5/001; H04L 5/0007; H04L 5/0094; H04L 5/0055; H04L 5/0092; H04L 5/0096; H04W 72/042; H04W 72/04; H04W 72/0453; H04W 52/0229
See application file for complete search history.

(56) References Cited

U.S. PATENT DOCUMENTS

| 8,934,417 B2 * | 1/2015 | Nory | H04W 72/1289 370/329 |
| 2009/0088148 A1 * | 4/2009 | Chung | H04L 1/0029 455/423 |
| 2015/0124764 A1 | 5/2015 | Nishio et al. | |

FOREIGN PATENT DOCUMENTS

| EP | 1988667 A2 | 5/2008 |
| WO | 2010050234 A1 | 6/2010 |

OTHER PUBLICATIONS

Motorola: "Search Space Definition: Reduced PDCCH Blind Detection for Split PDCCH Search Space"; 3GPP TSG RAN1#51, R1-074583, Nov. 2007, 4 Page Document.
(Continued)

*Primary Examiner* — Ajit Patel (57) ABSTRACT

The present invention relates to a method for communicating between a primary station and at least one secondary station, comprising configuring a secondary station being in a first state to search at least one of a plurality of search spaces having a first structure, said first structure consisting of at least a first number of resource sets having a first size, where at least one resource set might be used to transmit a message to the considered secondary station, changing the search space structure to a second structure different from the first structure when the secondary station enters into a second state.

39 Claims, 2 Drawing Sheets

(51) Int. Cl.
*H04L 5/00* (2006.01)
*H04W 52/02* (2009.01)

(56) References Cited

OTHER PUBLICATIONS

Catt: Consideration on DRX; 3GPP TSG RAN WG2 Meeting #66, R2-092992, May 4-8, 2009, 2 Page Document.
Ericsson: "Characterization of Downlink Control Signaling for LTE-Advanced"; TSG-RAN WG1 Meeting #56, R1-090907, 6 Page Document.
Ericsson: "Carrier Aggregation in LTE-Advanced"; TSG-RAN WG1 #53bis. R1-082468, Jun. 30-Jul. 4, 2008, 6 Page Document.
Texas Instruments: "Issues on Carrier Aggregation for Advanced E-UTRA": 3GPP TSG RAN WG1-#55bis, R1-090280, Jan. 12-16, 2009, 5 Page Document.
NTT Docomo, "DL Layered Control Signal Structure in LTE-Advance", 3GPP TSG RAN WG1 Meeting #55BIS, R1-090311, 2009, pp. 1-7.
Huawei, "PDCCH Design for Carrier Aggregation", 3GPP TSG RAN WG1 #55BIS, R1-090127, 2009, pp. 1-5.

* cited by examiner

METHOD FOR COMMUNICATION IN A MOBILE NETWORK

FIELD OF THE INVENTION

The present invention relates to a method for communicating in a network. More specifically, the present invention relates to communication between a primary station and a secondary station, in a telecommunication network, like a cellular telecommunication network (e.g. UMTS, GSM).

BACKGROUND OF THE INVENTION

In UMTS LTE the downlink control channel PDCCH (Physical Downlink Control Channel) carries information such as resource allocation for uplink or downlink transmission. A PDCCH message can use 1, 2, 4 or 8 Channel Control Elements (CCEs or resource elements)—referred to as CCE aggregation levels 1, 2, 4 or 8. PDCCH messages can be transmitted using one of a set of available message formats (e.g. with different signal characteristics such as number of information bits and channel coding rate, The different formats are referered to in the LTE specifications as "DCI formats". In addition, different destinations or purposes for the PDCCH messages may be indicated by different scrambling sequences applied to the message CRC (in the LTE specifications the different scrambling sequences correspond to different identities, referred to as RNTIs). Different RNTIs are used to distinguish UE-specific PDCCH messages intended for a particular UE, from Common PDCCH messages intended for reception by more than one UE. In the case of a PDCCH message intended for reception by more than one UE, this could be for a defined group of UEs, or any UE.

A mobile station, like a UE in LTE, does not know in advance the location in CCE space of messages intended for it. In principle, the mobile station could attempt to blindly decode all the possible PDCCHs with different starting positions in the CCE space and thus receive any messages intended for that mobile station. However, if the CCE space is large the processing complexity is prohibitive. Therefore a more limited search is configured which consists of a number of search spaces. A UE may search a given search space for messages with one of more DCI formats. For simplicity of explanation, we may consider only one DCI format and one RNTI in a UE-specific search space, but the same discussion is applicable for multiple DCI formats, multiple RNTIs and for UE-specific and Common search spaces.

A search space is a set of aggregated CCEs (with a certain aggregation level) within which a mobile station (or user equipment (UE) or secondary station) performs blind decoding of all PDCCH payloads (DCI formats and RNTIs) that it assumes may be transmitted for that aggregation level. The set of PDCCH payloads that the UE assumes may be transmitted may be a subset of all possible PDCCH payloads defined by the LTE specification. Search spaces are defined per aggregation level; a secondary station thus can have up to four search spaces. For example, the search space of a UE for aggregation level 1 (referred to as 1-CCE) could consist of the CCEs indexed 3,4,5,6,7,8, while its search space for aggregation level 8 could consist of the two resource sets of aggregated CCEs consisting of the CCEs indexed by 1,2, ... 8 and 9,10, ... ,16, respectively. In this example, the UE thus performs six blind decodings for 1-CCEs and two blind decodings for 8-CCEs.

The LTE specification currently requires the UE to perform the following in a search spaces designed for UE-specific PDCCH messages on a single carrier:

6 decoding attempts of 1-CCE aggregation
6 decoding attempts of 2-CCE aggregation
2 decoding attempts of 4-CCE aggregation
2 decoding attempts of 8-CCE aggregation In addition the UE is required to perform the following in a search spaces designed for Common PDCCH messages on a single carrier:

4 decoding attempts of 4-CCE aggregation
2 decoding attempts of 8-CCE aggregation In general, the UE may be required to search one or more sets of search spaces which could be considered as being grouped together to form one or more search space structures.

The larger aggregations are intended to be used for large messages, and/or small messages when a lower code rate is required, for example under bad channel conditions. However, restricting the search spaces to reduce processing complexity limits the availability of suitable aggregations for different radio channel conditions as those conditions vary.

In the case that the system supports the use of multiple carrier frequencies simultaneously, then one possible method of operating the above described system would be to send a PDCCH on each carrier that is to be used for data transmission. In this scenario, it would be desirable to limit the processing power required to search for the possible PDCCHs.

SUMMARY OF THE INVENTION

It is an object of the invention to propose a method of communication which alleviates the above mentioned problem.

It is another object of the invention to provide a method enabling the search space to be adapted to the situation, without causing more signalling or overhead.

To this end, in accordance with the invention, a method is proposed for communicating between a primary station and at least one secondary station, comprising (a) configuring a secondary station being in a first state to search at least one of a plurality of search spaces having a first structure, said first structure consisting of at least a first number of resource sets having a first size, where at least one resource set might be used to transmit a message to the considered secondary station, (b) changing the search space structure to a second structure different from the first structure when the secondary station enters into a second state.

As a consequence, the structure of the search space may be changed in accordance with a particular situation. In the case that the second structure requires more power to be expended by the secondary station in order to receive it, for example because it contains more resources, it would be advantageous to secondary station power consumption to use the first structure when the communication with the secondary station is at a low data rate and switch to the second structure when the data rate is high. As a further example, in case of a change in the transmission characteristics, like the channel conditions, it is possible to change the search space. The channel conditions may change because of new interference sources or because of mobility of a secondary station approaching the cell edge.

The present invention also relates to a primary station comprising means for communicating with at least one secondary station, comprising configuring means for configuring a secondary station in first state to search at least one of a plurality of search spaces having a first structure, said first structure consisting of at least a first number of resource sets having a first size, where at least one resource set might be used to transmit a message to the considered secondary station, and wherein the configuring means are arranged for changing the search space structure to a second structure different from the first structure when the secondary station enters into a second state.

In accordance with still another aspect of the invention, a secondary station is proposed, said secondary station comprising means for communicating with a primary station, said secondary station comprising control means for activating searching at least one of a plurality of search spaces having a first structure when the secondary station is in a first state, said first structure consisting of at least a first number of resource sets having a first size, where at least one resource set might be used to transmit a message to the considered secondary station, wherein the control means are arranged for changing the search space structure to a second structure different from the first structure in response to a indication from the primary station of a change in the search space structure, when the secondary station enters into a second state.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawing, wherein.

DETAILED DESCRIPTION OF THE INVENTION

The present invention relates to a method for communicating in a network, like a cellular network. For instance, the network may be a UMTS LTE network as depicted on FIG. 1.

Figure 1:
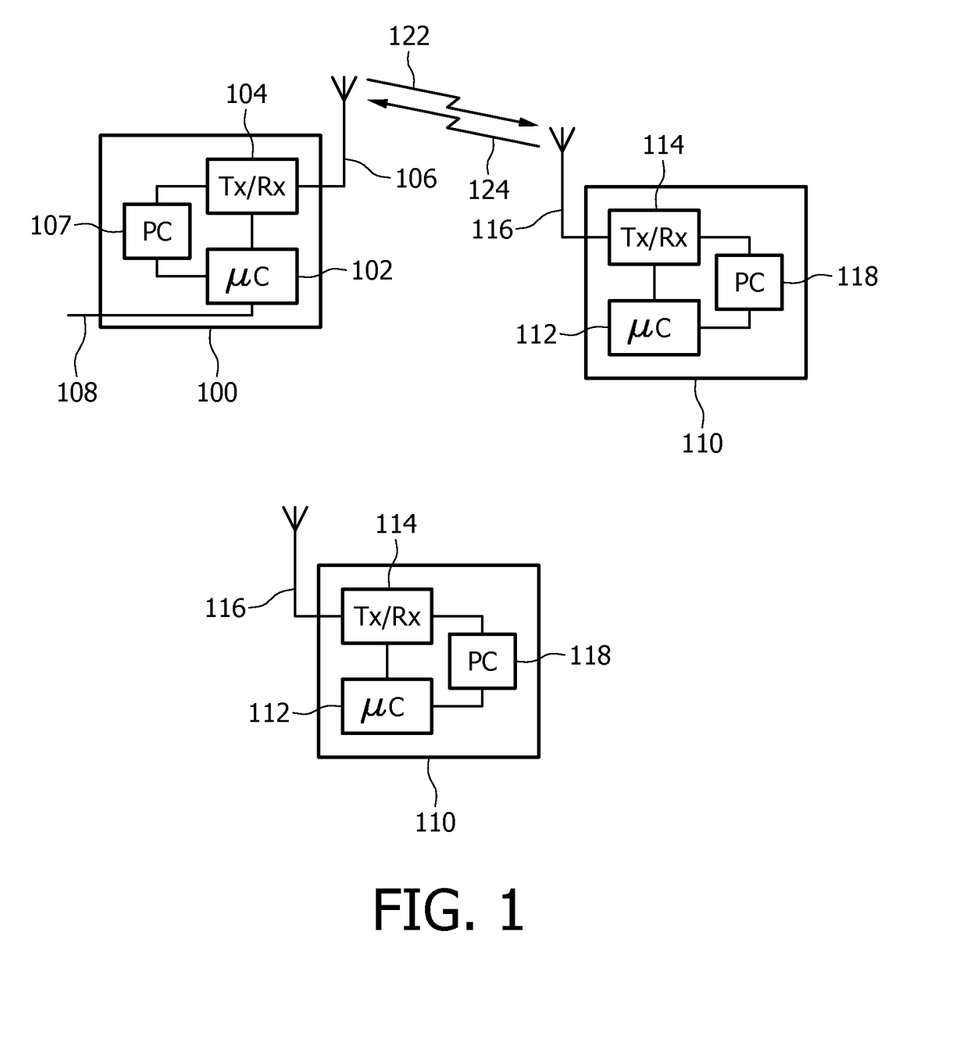
FIG. 1 is a block diagram of a system in accordance with the invention comprising a primary station and at least a secondary station.

Referring to FIG. 1, a radio communication system in accordance with the invention comprises a primary station (BS or eNodeB) 100 and a plurality of secondary stations (MS or UE) 110. The primary station 100 comprises a microcontroller (μC) 102, transceiver means (Tx/Rx) 104 connected to antenna means 106, power control means (PC) 107 for altering the transmitted power level, and connection means 108 for connection to the PSTN or other suitable network. Each UE 110 comprises a microcontroller (μC) 112, transceiver means (Tx/Rx) 114 connected to antenna means 116, and power control means (PC) 118 for altering the transmitted power level. Communication from primary station 100 to mobile station 110 takes place on downlink channels, while communication from secondary station 110 to primary station 100 takes place on uplink channels. In this example, the downlink channels comprise control channels, like PDCCH. Such control channels may be transmitted over a plurality of carriers. These carriers may be defined by the frequency of the carrier or in a variant of the invention, by coding scheme or modulation.

The first embodiment of the invention provides a fast and efficient means for signalling a search space (or sets of search spaces) in which control channels may be transmitted on multiple carriers for a communication system such as LTE or LTE Advanced.

In such a mobile network using a single carrier for communication with the UE, for instance in compliance with the first release of the LTE specifications (Rel-8), a single carrier of up to 20 MHz is used. A control signalling message on the Physical Downlink Control Channel (PDCCH) to signal allocations of transmission resources. Each UE is configured with at least one search space within which to search for such signalling messages, in order to avoid having to decode every possible location in every subframe, which would result in a very large blind decoding overhead. However, in the developments of LTE, single carrier operation is extended to multiple carriers (described as "component carriers"), and signalling will be needed to indicate resource allocations on each of the component carriers (CCs). It is desirable to avoid a significant increase in the number of blind decodes required to detect signalling on multiple CCs.

The current main options considered in 3GPP for using PDCCHs to signal resource allocations on multipe CCs are:
1. To have separate PDCCHs for each component carrier (CC) where either:
   One PDCCH indicates an allocation on the same CC
   or
   One PDCCH indicates an allocation on the same or a different CC.
Or,
2. one common PDCCH where the information for the component carriers assigned to one UE is jointly encoded and where either
   The DCI format size is dynamically changed according to the number of CCs assigned
   Or
   The DCI format size is semi-statically fixed according to the number of CCs the UE is monitoring.

It is therefore beneficial in either case for there to be a search space for PDCCH messages on each carrier (i.e. a set of possible locations for a PDCCH in each of which the UE attempts to decode at least one PDCCH payload (i.e. blind decoding). It is to be noted that we refer to one DCI format and RNTI, as an example, and other numbers of DCI formats and RNTI can be used. In general, it would be desirable for the UE to be able to receive a PDCCH on any of the CCs (and possibly more than one PDCCH at the same time).

In order to avoid too great an increase in signal processing due to the total number of blind decodes, the search space on each component carrier should be kept as small as possible. However, a small search space imposes scheduling constraints. It is therefore desirable to be able to reconfigure such search spaces in an efficient way.

Also, there is a power consumption overhead (e.g. in the receiver) if a UE is required to receive all the CCs irrespective of whether there is likely to be any PDCCH present for that UE. This could be particularly significant for the case of component carriers in widely separated frequency bands requiring separate receivers.

One potential solution would be for a PDCCH message on an anchor carrier to signal the exact location of the PDCCH messages on the other component carriers. This avoids any increase in the number of blind decodes required, as none are required for the additional carriers. However, it has the drawback that every resource allocation on any carrier requires a PDCCH message on the anchor carrier. This could result in the PDCCH becoming overloaded.

Another possibility in connection with LTE, which addresses some of these problems, is discontinuous reception (DRX). In the absence of any downlink packets for a given UE, the UE receiver may be configured so that it only receives PDCCH every Nth subframe. At other times it may "sleep", saving power. As soon as any PDCCH is received the UE receiver is activated for a given number of subframes. In this state the UE can potentially receive high data rates.

In accordance with a first examplary embodiment, the system of such an embodiment implemented in the above described context provides fast and efficient signalling to enable to the UE to identify the appropriate search spaces, at least on other carriers, and possibly also on an anchor carrier. A feature of this embodiment is that a specific search space is associated with each of two (or possibly more) UE states.

In one possible variant of this embodiment, the first state, "state one", is entered when no PDCCH has been received for a given number of subframes and the second state, "state two", is entered when a PDCCH is received. The search space for state one consists of possible PDCCH locations on one subset of component carriers. The search space for state two consists of possible PDCCH locations on a second subset of component carriers. The number of CCs in the first set is smaller than the number of CCs in the second set. Therefore the UE requires less power to receive the PDCCHs in state one than state two. As an advantageous example, the first subset may comprise a single carrier (e.g. the anchor carrier) and the second subset may comprise all the available (or configured) CCs.

Figure 2:
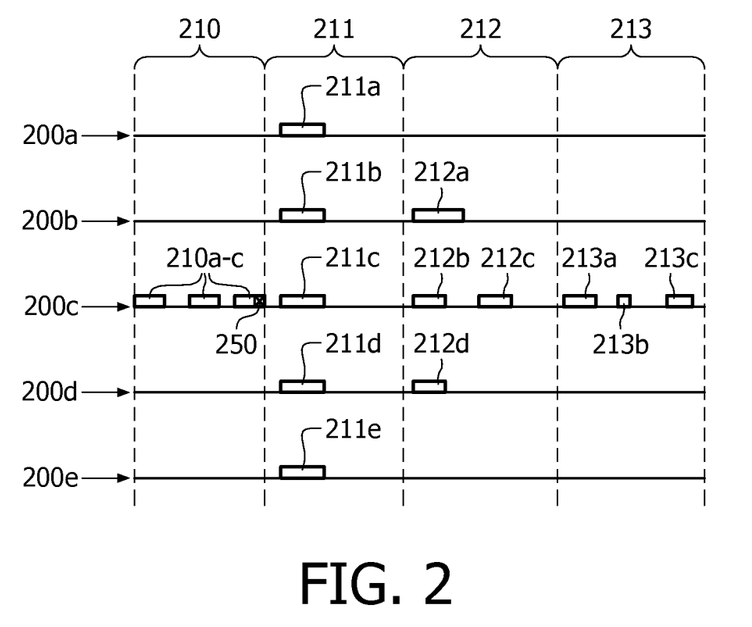
FIG. 2 is a time chart of the search spaces of a system in accordance with a first embodiment of the invention.

FIG. 2 depicts an example of this embodiment where a plurality of component carriers 200a to 200e which may be used for transmission of PDCCH are illustrated, the anchor component carrier being component carrier 200c. As illustrated on FIG. 2, the component carriers are divided in several phases 210 to 213 corresponding to the state changes of the mobile terminal 110. Here, three different states are defined.

In phase 210, the mobile terminal 110 is in state one, and a first set of search spaces 210a-c is dedicated to this mobile terminal in successive time intervals. These search spaces are on a limited number of component carriers, here only on the anchor component carrier 200c. As a consequence, it requires only a limited amount of energy to search these search spaces. Note that the search spaces are illustrated in a logical sense as contiguous blocks of resources. In a practical embodiment interleaving could be applied to distribute these resources over the frequency domain.

A control message 250 dedicated to this mobile terminal 110 is transmitted in the search space 210c and thus received by the mobile terminal. This reception may cause the mobile terminal 110 to enter into another state, like a state three.

In phase 211, the mobile terminal enters into state three, since it has just received the message 250. In state three, the search spaces 211a-e are distributed over all the component carriers 200a to 200e. This has the consequence of requiring more energy at the mobile terminal to search the spaces. If no message is received in these search spaces over a predetermined duration, in an example of this embodiment, the mobile station 110 enters into state two, in phase 212. It is to be noted that, should the mobile station 110 have received a message in this state over the predetermined duration, it would have stayed in this state three longer. It is to be noted that the number of search spaces may vary from one state to another.

In phase 212, the mobile terminal is in state two, where the search spaces 212a-d are distributed over a subset of the carrier components 200b to 200d. In a variant of this example, search space 212c may not be included since the anchor carrier may be reserved for state one search spaces. It is to be noted that it is advantageous from an energy consumption point of view to have the search spaces close to the anchor component carrier. This would allow processing by one receiver chain, in contrast to widely separated carriers which may require independent receiver chains. If no message is received in these search spaces 212a-d over a predetermined duration, in an example of this embodiment, the mobile station 110 enters into state one, in phase 213. It is to be noted that, should the mobile station 110 have received a message in this state over the predetermined duration, it would have returned to state three.

In phase 213, the mobile terminal 110 is in state one, where the search spaces 213a-c are only on the anchor component carrier 200c. It may stay in this state until a message is received. It may also return to state two or three, under certain conditions.

In a particular variation of the embodiment, for instance with two states, when the UE receives a PDCCH it enters the second state for a given number of subsequent subframes.

The entering of the second state may take effect at the next subframe boundary, or at some later time which may be preconfigured, indicated by higher-layer signalling, or included as a time offset indication within the PDCCH message itself. In a further variation of the embodiment, when the UE in state one receives a PDCCH it enters the second state for the current subframe, and attempts to decode PDCCHs on the second set of CCs.

It is to be noted that the structure of the search spaces in some of the corresponding phases or states can be selected from a predetermined set of search space structures in dependence on the UE capabilities. Indeed, each kind of secondary station may have particular capabilities with respect to their reception, for example their abilities in buffering and decoding a number of different signals received, possibly simultaneously, over a given time interval, which requires sufficient memory and computation power. Moreover, during operation, the UE battery charge may become low, and to save electrical energy, some structures requiring a lot of decoding for example, may be avoided. Thus, the first state is a state with low battery charge, and the second state is a state with high battery charge. In an example of this embodiment, the capabilities of the UE are characterised by the ratio of a first energy required to receive all the resource sets corresponding to a first structure to a second energy required to receive all the resource sets corresponding to a second structure. To achieve a power saving with a low battery charge the first energy must be less than the second energy. The energy required to receive a resource set can be defined by the electrical energy required to buffer and decode the signal corresponding to that resource set, from among the set of signals, each corresponding to one of the a resource sets within the whole search space.

Whether the UE enters the second state for the current subframe or not may depend on the extent to which the UE can save power by reducing the number of CCs on which it attempts to decode the PDCCH. For example, if the CCs are adjacent (i.e. comprising a contiguous frequency block), the UE may receive all the CCs with a single receiver, with the result that there is no significant efficiency increase by attempting to decode the PDCCH on only one of the CCs. On the other hand, if the CCs are separated in frequency, the UE may need to use multiple receivers and significant power may be saved by switching off some of the receivers for some of the CCs. Therefore in one embodiment the UE is expected to enter state two in the current subframe if the CCs are adjacent, and to enter state two in a later subframe if the CCs are not adjacent. In other words, for this embodiment the following conditions may be identified:

in the case of adjacent carriers:
    for a UE in state one the eNodeB may send PDCCH messages on more than one CC, provided that one of the PDCCH messages is sent on a CC which is the anchor carrier for a UE in state two the eNodeB may send a PDCCH message on any CC(s).

in the case of non-adjacent carriers:
for a UE in state one the eNodeB may only send a PDCCH message on the anchor carrier
for a UE in state two the eNodeB may send a PDCCH message on any CC(s).

One possible embodiment involves each of the search spaces being comprised of two (or more) preconfigured sets of search subspaces (with the preconfiguring typically being done by higher-layer signalling) and associate each one with a first index. Each carrier can also be associated with a second index. A PDCCH message on one carrier can then indicate the first index of a search space and a second index of a corresponding carrier.

Another possible embodiment comprises signalling the full details of the search space (together with a corresponding carrier index) in a PDCCH message of a special format.

A further embodiment of the invention is now described. This further embodiment can be combined the preceding embodiments or be implemented independently of the previous embodiment.

This particular embodiment of the invention provides a method for hopping the location of PDCCH across multiple component carriers in a communication system such as LTE Advanced. The hopping is designed such that different UEs have different hopping sequences and the hopping sequences for a given UE are also different on different carriers.

In the first release of the LTE specifications (Rel-8), a single carrier of up to 20 MHz is used. A control signalling message on the Physical Downlink Control Channel (PDCCH) to signal allocations of transmission resources. Each UE is configured with a search space within which to search for such signalling messages, in order to avoid having to decode every possible location in every subframe, which would result in a very large blind decoding overhead.

When LTE is extended to multiple carriers, signalling will be needed to indicate resource allocations on each of the component carriers. It is desirable to avoid a significant increase in the number of blind decodes required.

The current main options considered in 3GPP are:
1. To have separate PDCCHs for each component carrier (CC) where either:
   One PDCCH indicates an allocation on the same CC
   or
   One PDCCH indicates an allocation on the same or a different CC
Or,
2. one common PDCCH where the information for the component carriers assigned to one UE is jointly encoded and where either
   The DCI format size is dynamically changed according to the number of CCs assigned
   or
   The DCI format size is semi-statically fixed according to the number of CCs the UE is monitoring.

It is therefore beneficial in either case for there to be a search space for PDCCH messages on each carrier (i.e. a set of possible locations for a PDCCH in each of which the UE attempts to decode a PDCCH) (i.e. blind decoding).

However, the further details are not yet defined. In general, it would be desirable for the UE to be able to receive a PDCCH on any of the CCs (and possibly more than one PDCCH at the same time). In order to avoid too great an increase in signal processing due to the total number of blind decodes, the search space on each carrier should be kept as small as possible.

Currently in LTE Release 8, the search space for PDCCH for a given UE changes from subframe to subframe according to the following in TS36.213 here reproduced:

"The set of PDCCH candidates to monitor are defined in terms of search spaces, where a search space $S_k^{(L)}$ at aggregation level $L \in \{1,2,4,8\}$ is defined by a set of PDCCH candidates. The CCEs corresponding to PDCCH candidate m of the search space $S_k^{(L)}$ are given by $$L \cdot \{(Y_k + m) \bmod \lfloor N_{CCE,k}/L \rfloor\} + i$$

where $Y_k$ is defined below, $i = 0, \ldots, L-1$ and $m = 0, \ldots, M^{(L)}-1$. $M^{(L)}$ is the number of PDCCH candidates to monitor in the given search space.

For the UE-specific search space $S_k^{(L)}$ at aggregation level L, the variable $Y_k$ is defined by $$Y_k = (A \cdot Y_{k-1}) \bmod D$$

where $Y_{-1} = n_{RNTI} \neq 0$, $A = 39827$, $D = 65537$ and $k = \lfloor n_s/2 \rfloor$, $n_s$ is the slot number within a radio frame. The RNTI value used for $n_{RNTI}$, is defined in section 7.1 in downlink and section 8 in uplink."

The RNTI value is specific to the UE, and the aggregation level is 1, 2, 4 or 8.

This method gives different sequences for different UEs, and avoids the problem of two UEs continuously having the same search space on one carrier, but does not provide for different search spaces on different component carriers. Therefore any UEs with the same search space on one carrier would also have the same search space on the other carriers also. This could lead competition for control channels, and inefficient scheduling of resources.

In accordance with this further embodiment, different search spaces are provided on different carriers, both for the same UE and for different UEs. This is achieved by introducing the component carrier number in into the search space equation.

In one variant of this embodiment, the search space for a given component carrier, $n_{CC}$, is defined using $$Y_{k,ncc} = (A \cdot Y_{k-1,ncc}) \bmod D$$

with $k = 10 \times n_{CC} + \lfloor n_2/2 \rfloor$, assuming the first component carrier has $n_{CC} = 0$.

This is equivalent to extending the hopping sequence beyond 1 radio frame and applying the additional values of the sequence in a different component carrier. The sequence for the first component carrier is unchanged.

In an extension to this embodiment the CC number is derived by ordering the CCs configured for that UE in terms of their frequency. Alternatively the CCs are assigned to UE in a particular order.

Alternatively, to generate fewer sequence entries $k = n_{CC} + \lfloor n_3/2 \rfloor$ or to re-use Rel8 sequence values $k = (n_{CC} + \lfloor n_2/2 \rfloor) \bmod 10$. These options have low complexity.

A general form could be $k = (a \times n_{CC} + \lfloor n_3/2 \rfloor)b$ where a and b are constants.

Alternatively, the values of A and/or D could be different for different CCs, but this would lead to higher implementation complexity.

Figure 3:
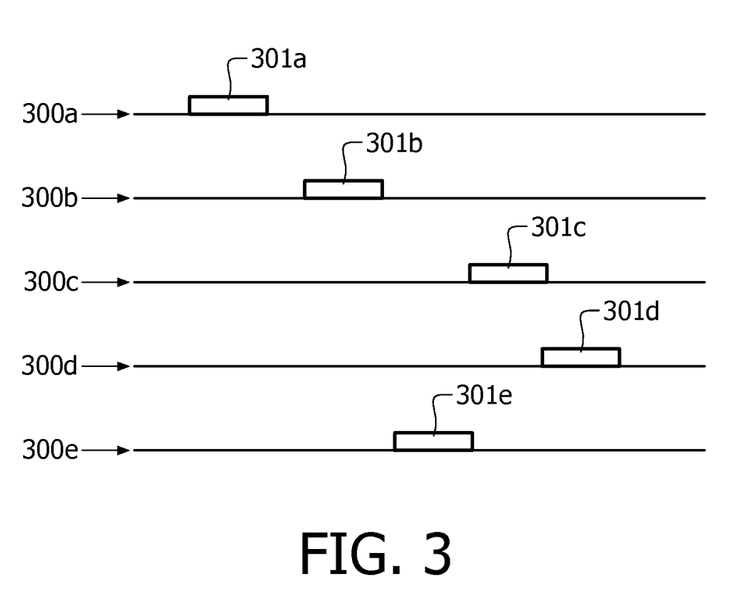
FIG. 3 is a time chart of the search spaces of a system in accordance with a first embodiment of the invention.

FIG. 3 illustrates an example of the above mentioned embodiment. In accordance with this embodiment, and as depicted on FIG. 3, a plurality of search spaces 301a-e are distributed over the component carriers 300a-e. It can be seen on FIG. 3, that the search spaces are different from a carrier component to another, i.e. the resource blocks may vary from a carrier component to another. Moreover, these search spaces vary over the time. Note that the search spaces are illustrated in a logical sense as contiguous blocks of resources. In a practical embodiment interleaving could be applied to distribute these resources over the frequency domain.

The invention may be applicable to mobile telecommunication systems like UMTS LTE and UMTS LTE-Advanced, but also in some variants to any communication system having allocation of resources to be done dynamically or at least semi persistently.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A method of operating a primary station for communicating in a network with at least one secondary station, the method comprising acts of:
    in a primary station:
        configuring a secondary station being in a first state to search at least one of a plurality of search spaces having a first structure, the first structure consisting of at least a first number of resource sets having a first size, where at least one resource set of the first number or resource sets is used to transmit a message to the secondary station,
        reconfiguring the secondary station by changing the search space structure from the first structure to a second structure different from the first structure when the secondary station enters into a second state, the second structure consisting of at least a second number of resource sets, the first number of resource sets being smaller than the second number of resource sets, wherein different search spaces are provided for different component carriers during multiple carrier operation,
    wherein a control channel search space size is expanded during a multiple carrier operation, and
    wherein control channel search spaces of different sizes are provided for different component carriers during the multiple carrier operation.

2. The method of claim 1, wherein the first state is entered when a time elapsed since the secondary station has received a message is above a predetermined time threshold.

3. The method of claim 1 wherein the second state is entered when a time elapsed since the secondary station has received a message is below a predetermined time threshold.

4. The method of claim 2, wherein the message is a signaling message from the primary station.

5. The method claim 1, wherein the at least one of the first structure and the second structure is selected depending on capabilities of the secondary station.

6. The method of claim 5, wherein one of the capabilities of the secondary station is a ratio of a power required to receive the resource sets corresponding to the first structure to a power required to receive the resource corresponding to the second structure.

7. The method of claim 1, wherein the second structure consists of at least a second number of resource sets having the first size.

8. The method of claim 7, wherein the second number of resource sets are for different component carriers.

9. The method of claim 1, wherein the secondary station enters into the first state for a predetermined duration.

10. The method of claim 1, wherein the secondary station enters into the first state and searches the first structure to save power.

11. The method of claim 10 wherein the first structure includes a limited number of carriers relative to the second structure.

12. The method of claim 1, wherein the second structure is signaled by the primary station.

13. A secondary station for communicating with a primary station, said secondary station comprising:
    a processor; and
    a memory, the memory containing instructions that, when executed by the processor, configure a secondary station to:
        activate searching at least one of a plurality of search spaces having a first structure when the secondary station is in a first state, the first structure consisting of at least a first number of resource sets having a first size, where at least one resource set of the first number of resource sets, is used to transmit a message to the secondary station,
        change the search space structure to a second structure, different from the first structure in response to an indication from the primary station of a change in the search space structure, the second structure consisting of at least a second number of resource sets, the first number of resource sets being smaller than the second number of resource sets, when the secondary station enters into a second state,
        wherein different search spaces are provided for different component carriers during multiple carrier operation,
        wherein the control channel search space size is expanded during a multiple carrier operation, and
        wherein control channel search spaces with different sizes are provided for different component carriers during the multiple carrier operation.

14. A primary station for communicating with at least one secondary station, the primary station comprising:
    a processor; and
    a memory, the memory containing instructions that, when executed by the processor, configure a primary station to:
        configure a secondary station in a first state to search at least one of a plurality of search spaces having a first structure, the first structure consisting of at least a first number of resource sets having a first size, where at least one resource set of the number of resource sets is used to transmit A message to the secondary station, and
        changing the search space structure to a second structure, different from the first structure, the second structure consisting of at least a second number of resource sets, the first number of resource sets being smaller than the second number of resource sets, when the secondary station enters into a second state,
        wherein different search spaces are provided for different component carriers during multiple carrier operation,
        wherein the total control channel search space size is expanded during multiple carrier operation, and wherein control channel search spaces with different sizes are provided for different component carriers during the multiple carrier operation.

15. A method operating a primary station for communicating in a network with at least one secondary station, the method including acts of:
in a primary station:
configuring a secondary station to search a plurality of search spaces having a first structure,
wherein each search space corresponds to at least one resource set of a first number of resource sets for a respective component carrier,
wherein the at least one resource set is used to transmit a message to the secondary oration,
the second structure consisting of at least a second number of resource sets, the first number of resource sets being smaller than the second number of resource sets,
wherein different search spaces are provided for different component carriers during a multiple carrier operation and a selected search space for a component carrier depends on an identity of the component carrier,
wherein a control channel search space size is expanded during a multiple carrier operation, and
wherein control channel search spaces with different sizes are provided for different component carriers during the multiple carrier operation.

16. A secondary station for communicating with a primary station, the secondary station comprising:
a processor; and
a memory, the memory containing instructions that, when executed by the processor, configure secondary station to:
activate searching a first structure of a plurality of search spaces having at least one first resource set for a respective component carrier, wherein the at least one resource set is used to transmit a message to the secondary station,
activate searching a second structure of a plurality of search spaces, the second structure consisting of at least a second number of resource sets, a first number of the first resource set being smaller than a number of the second of resource sets,
wherein different search spaces are provided for different component carriers during multiple carrier operation and a selected search space for a component carrier depends on an identity of the component carrier,
wherein a control channel search space size is expanded during a multiple carrier operation, and
wherein control channel search spaces with different sizes are provided for different component carriers during the multiple carrier operation.

17. A primary station for communicating with at least one secondary station, the primary station comprising:
a processor; and
a memory, the memory containing instructions that, when executed by the processor, configure the a primary station to:
configure a secondary station to search a plurality of search spaces, each search space corresponding to at least one resource set for a respective component carrier,
wherein at least one resource set is used to transmit a message to the secondary station,
wherein a first number of resource sets in a first search space is smaller than a second number of resource sets in a second search space,
wherein different search spaces are provided for different component carriers during multiple carrier operation and a selected search space for a component carrier depends on an identity of the component carrier,
wherein a control channel search space size is expanded during multiple carrier operation, and
wherein control channel search spaces with different sizes are provided for different component carriers during the multiple carrier operation.

18. The secondary station of claim 13, wherein the first state is entered when a time elapsed since the secondary station has received a message is above a predetermined time threshold.

19. The secondary station of claim 13, wherein the second state is entered when a time elapsed since the secondary station has received a message is below a predetermined time threshold.

20. The secondary station of claim 13, wherein the message is a signaling message from the palmary station.

21. The secondary station of claim 13, wherein the at least one of the first structure and the second structure is selected depending on capabilities of the secondary station.

22. The secondary station of claim 13, wherein one of the capabilities of the secondary station is a ratio of a power required to receive the resource sets corresponding to the first structure to a power required to receive the resource sets corresponding to the second structure.

23. The secondary station of claim 13, wherein the second structure consists of at least a second number of resource sets having the first size.

24. The method of claim 22, wherein the second number of resource sets are for different component carriers.

25. The method of claim 1, wherein the secondary station enters into the first state for a predetermined duration.

26. The method of claim 1, wherein the secondary station enters into the first state and searches the first structure to save power.

27. The method of claim 26, wherein the first structure includes a limited number of carriers relative to the second structure.

28. The method of claim 1, wherein the second structure is signaled by the primary station.

29. The primary station of claim 14, wherein the first state is entered when a time elapsed since the secondary station has received a message is above a predetermined time threshold.

30. The primary station of claim 14, wherein the second state is entered when a time elapsed since the secondary station has received a message is below a predetermined time threshold.

31. The primary station of claim 14, wherein the message is a signaling message from the primary station.

32. The primary station of claim 14, wherein the at least one of the first structure and the second structure is selected depending on capabilities of the secondary station.

33. The primary station of claim 14, wherein one of the capabilities of the secondary station is a ratio of a power required to receive the resource sets corresponding to the first structure to a power required to receive the resource sets corresponding to the second structure.

34. The primary station of claim 14, wherein the second structure consists of at least a second number of resource sets having the first size.

35. The primary station of claim 34, wherein the second number of resource sets are for different component carriers.

36. The method of claim 1, wherein the secondary station enters into the first state for a predetermined duration.

37. The method of claim 1, wherein the secondary station enters into the first state and searches the first structure to save power.

38. The method of claim 10 wherein the first structure includes a limited number of carriers relative to the second structure.

39. The method of claim 1, wherein the second structure is signaled by the primary station.

* * * * *